United States Patent [19]

Szeliga et al.

[11] 4,410,901

[45] Oct. 18, 1983

[54] ELECTROCHEMICAL MARKING

[75] Inventors: Philip C. Szeliga, Utica; William D. Kitchen, Ilion, both of N.Y.

[73] Assignee: Electromark, Div. of Mohawk International, Utica, N.Y.

[21] Appl. No.: 251,379

[22] Filed: Apr. 6, 1981

[51] Int. Cl.³ .................................... G01D 15/06
[52] U.S. Cl. ............................ 346/165; 101/93.04; 101/DIG. 13
[58] Field of Search ............... 346/155, 156, 164, 165; 101/93.04, 93.12, DIG. 13; 400/125

[56] References Cited

U.S. PATENT DOCUMENTS

| | | | |
|---|---|---|---|
| 2,715,360 | 8/1955 | Brown, Jr. | 346/165 X |
| 2,879,127 | 3/1959 | Carlson | 346/165 |
| 2,890,921 | 6/1959 | Mezger | 346/165 |
| 3,442,699 | 5/1969 | Dalton | 346/165 |
| 3,453,648 | 7/1969 | Stegenga | 400/125 X |

*Primary Examiner*—Thomas H. Tarcza
*Attorney, Agent, or Firm*—Bruns & Jenney

[57] ABSTRACT

A control device for programing information recorded upon a receiving part by an electrochemical marking head. In the main embodiment of the invention, the number recorded by the marking head is automatically sequenced after each marking cycle is completed.

7 Claims, 5 Drawing Figures

U.S. Patent  Oct. 18, 1983  Sheet 3 of 3  4,410,901
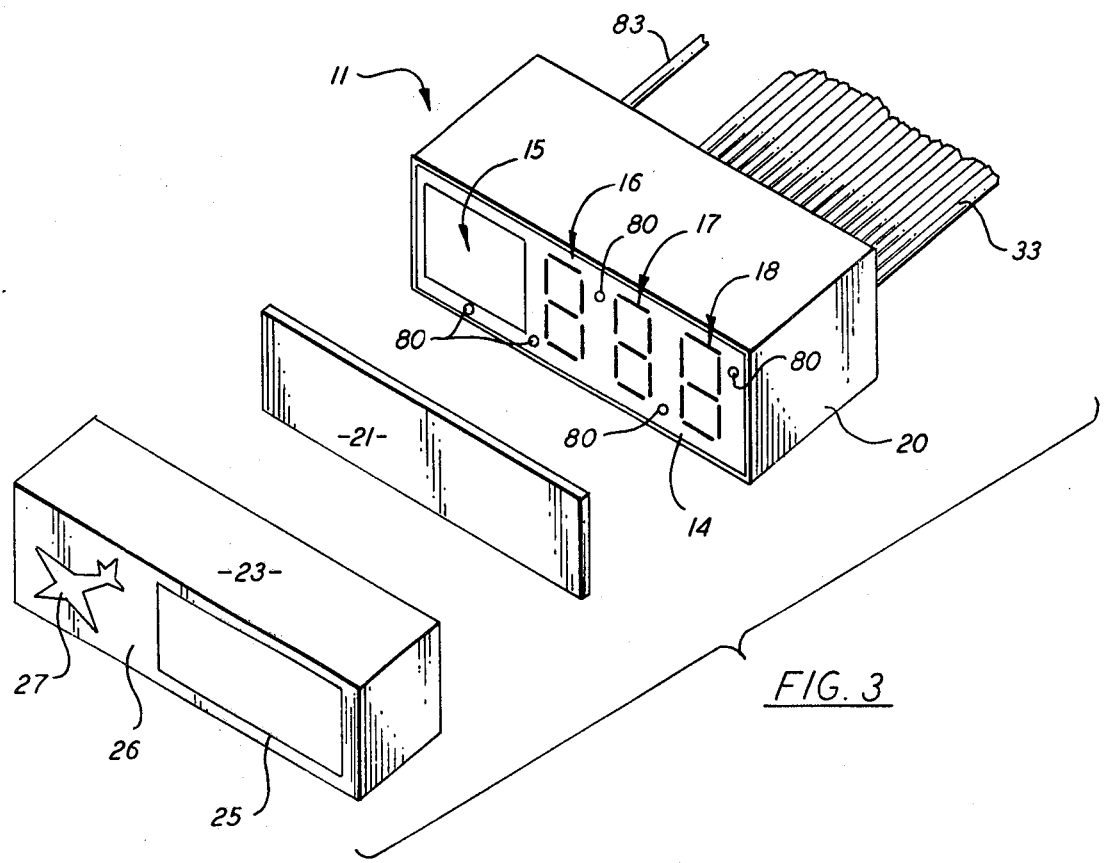
FIG. 3
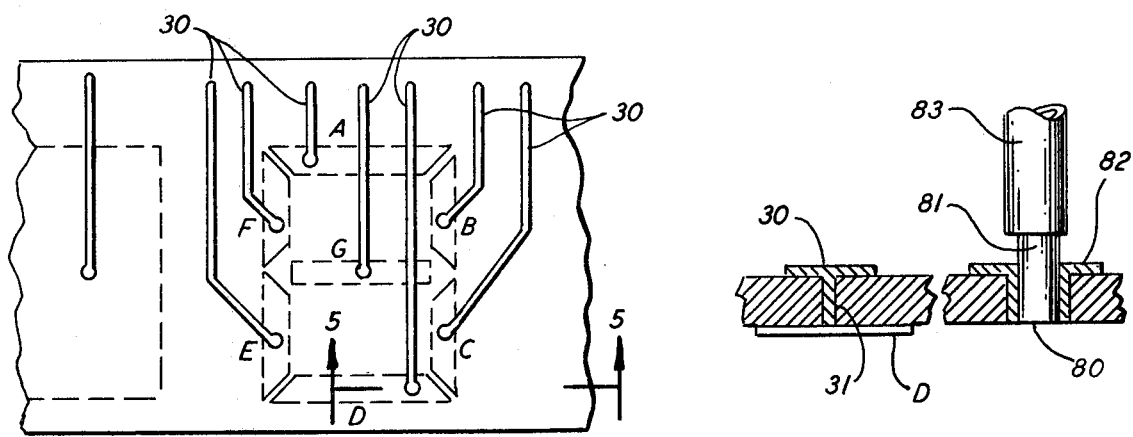
FIG. 4
FIG. 5

ELECTROCHEMICAL MARKING

BACKGROUND OF THE INVENTION

This invention relates to an electrochemical marking process and, in particular, to a programable marking head suitable for use in an electrochemical marking process.

In the electrochemical marking process, information is recorded upon a grounded conductive part by firing an electrode against the part in the presence of an electrolyte. Conventionally the charge pattern passing between the head and the receiving surface is shaped by a stencil having the desired design cut therein. An etch of the design is imaged upon the receiving surface which is filled with an oxide of the base metal to form a clearly discernible mark. The mark will not harm or deform the part and, as a result, the electrochemical process can be used to mark precision-made parts which could not otherwise be marked using other metal deforming techniques.

Although the electrochemical process has found widespread utilization in industry, the use of marking stencils has limited its applicability. In an application where individual parts are to be identified by different serial numbers, the stencil must be changed between each image recording cycle. Accordingly, a large number of stencils must be kept on hand. The handling of relatively large numbers of stencils has proven to be difficult and oftentimes leads to marking errors. Mismarking of parts, particularly precision-made parts, can be costly in that the parts must be scrapped or extensively reworked.

SUMMARY OF THE INVENTION

It is therefore an object of the present invention to improve the electrochemical marking process.

It is a further object of the present invention to provide an electrochemical marking system that can record information upon a receiving surface without the aid of a stencil.

Another object of the present invention is to provide an electrochemical marking system having a programmable marking head whereby information recorded upon a receiving part can be selectively changed between each marking cycle.

A still further object of the present invention is to improve the efficiency of the electrochemical marking process.

Yet another object of the present invention is to provide an electrochemical marking system for recording numbers in a pre-programed sequence upon conductive metal parts.

These and other objects of the present invention are attained by means of an electrochemical marking system that includes a programable marking head containing a plurality of electrode segments that are fired independently in various patterns to alter information recorded upon a receiving surface. Each electrode segment is connected to a control circuit that is adapted to automatically change the recorded information after each firing sequence.

BRIEF DESCRIPTION OF THE DRAWINGS

For a better understanding of these and other objects of the present invention, reference is had to the following detailed description of the invention which is to be read in conjunction with the accompanying drawings, wherein:

FIG. 3 is a perspective view of the programmable marking head utilized in the present system showing an electroded imaging board mounted in the front face thereof;

FIG. 4 is an enlarged partial view of the back face of the imaging board shown in FIG. 3 illustrating a number of terminals used to independently fire each of the electrodes; and FIG. 5 is a section taken along lines 5—5 in FIG. 4.

DESCRIPTION OF THE INVENTION

Turning now to the drawings wherein like parts are identified by like reference numbers, there is shown a marking system, generally referenced 10, for recording information upon conductive metal parts. The system includes a programmable marking head 11 and a control section 12 that are adapted to selectively energize a plurality of individual electrode segments contained in the head. As will be explained in greater detail below, the electrode segments can be programed to fire in different patterns in order to change the information upon the image receiving surface without the use of a stencil or other mechanical devices that might be used to shape the electrical imaging pulses.

Figure 1:
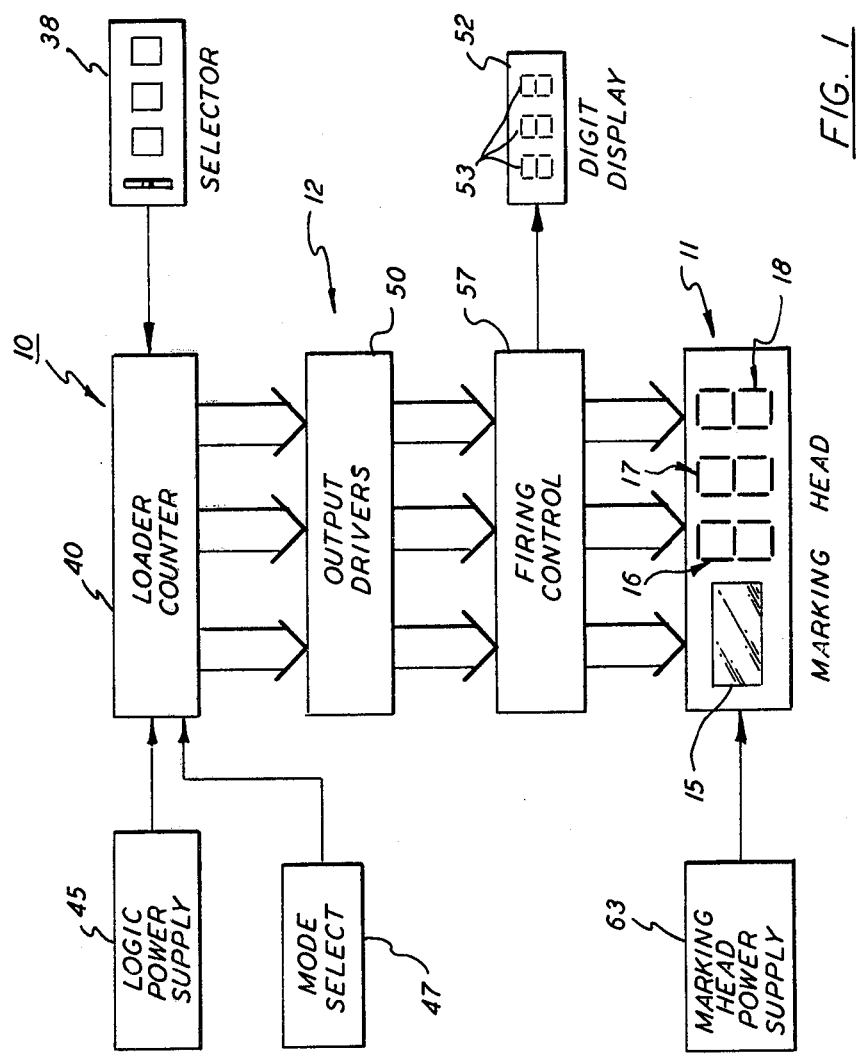
FIG. 1 is a block diagram of an electrochemical marking system embodying the teachings of the present invention.

As best seen in FIGS. 1 and 3, the front face of the marking head 11 contains an imaging board 14 upon which a plurality of electrode segments are strategically positioned so that selected data can be written upon a receiving surface. In this particular embodiment of the invention, the board contains a composing block 15 and three horizontally aligned digit modules 16-18 for selectively recording numerals 000 through 999 upon a receiving surface in response to a programed input from the control section of the system. It should be noted at this point that the format of the marking electrodes can be altered as to the size, shape and location thereon without departing from the teachings of the present invention. Although the operation of the present system will be explained with specific reference to a system for recording numbers in sequence upon metal parts, it should be further understood that the electrode configuration of the modules can be altered to record alphabetical along with numerical characters upon the receiving parts.

The imaging board 14 of the marking head is supported in the front wall of a rectangular-shape housing 20 to permit the electrode segments carried on the front face of the board to be pressed into contact against the surface to be marked. A wicking pad 21, which encompases the electrode segments, is placed between the head and the parts. Electrolyte is metered to the wick via capillary action from a supply reservoir (not shown) to wet the receiving surface in the imaging region. A rectangular-shaped cap 23 is passed over the wick and the front of the housing to complete the assembly. A clear window 25 is formed in the front wall 26 of the cap which, in assembly, frames the three digit modules. A design 27, such as a corporate logo or the like, is cut into the face of the stencil in the region that overlies the composing block 15. In operation the front face of the head is pressed against the surface to be marked and the electrodes are fired, as will be explained below, in programed order to create an image on the surface. In the present configuration the image consists of the design 27 and a three digit number for identifying the part. The exact number recorded on the part is sequentially changed through the control section by changing the electrode firing pattern.

Figure 2:
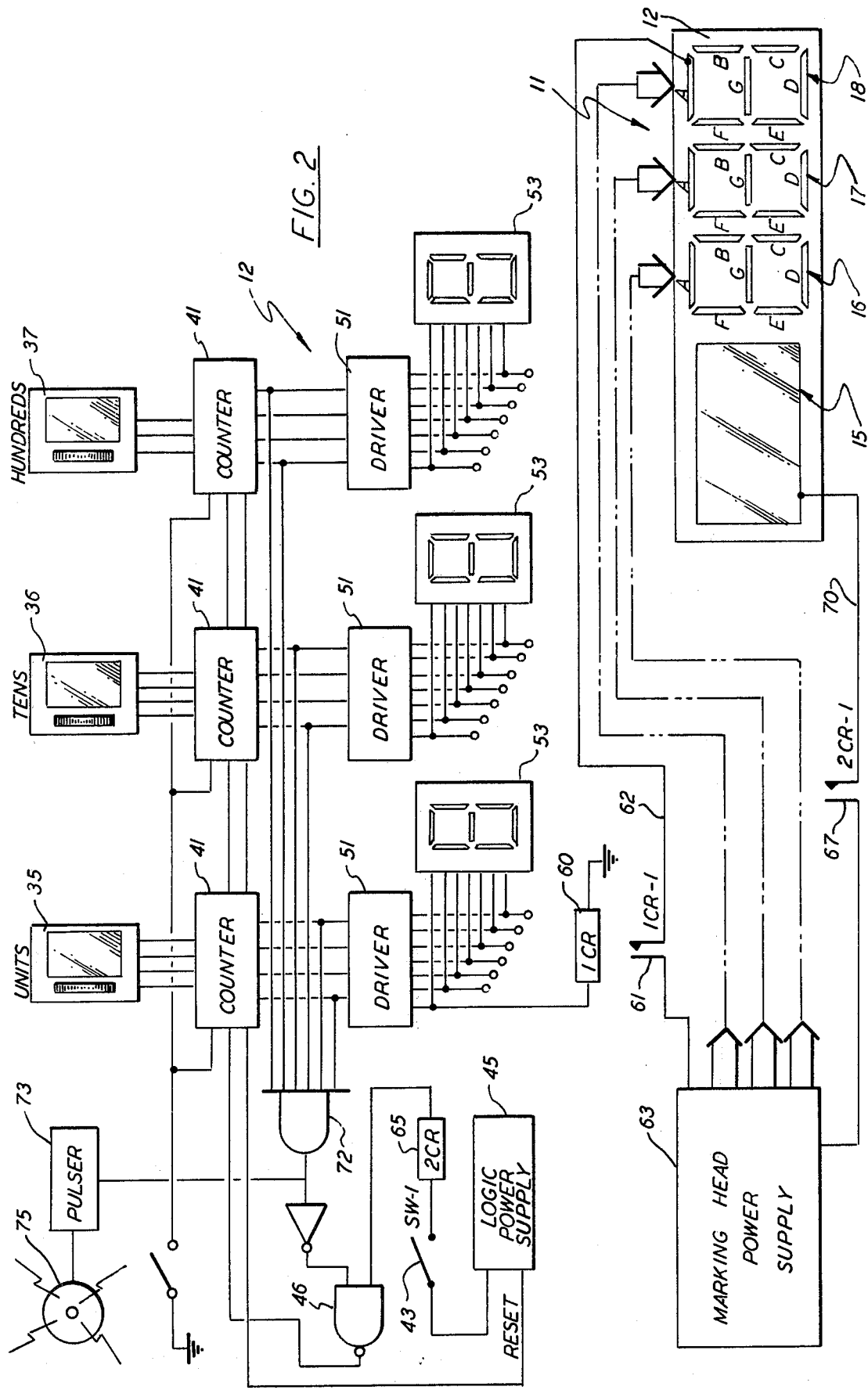
FIG. 2 is a schematic diagram of the marking system illustrated in FIG. 1.

The control section 12 of the present invention is shown in detail in FIGS. 1 and 2. In this main embodiment of the invention, the firing of the digit electrodes is programed so that the recorded numbers are increased by one integer after each marking cycle. Accordingly, the count, in this three digit arrangement, is sequenced upwardly from 0 to 999. Although not shown, the present control apparatus can be adapted to also count down in a similar sequence without departing from the teachings of the present invention.

As best seen in FIG. 2, each digit module contains a plurality of electrode segments that are electrically isolated one from the other. The segments are laid down on the board in a conventional 7-segment format that is normally used in light-emitting display tubes to provide a visual presentation. The electrode segments are each coated with a binder material that contains finely divided particles of carbon evenly dispersed throughout. The carbon and the binder are both impervious to the electrolyte and therefore function quite well in the process. Carbon by itself does not make an ideal electrode, however, because the segments tend to develop hot spots in and about the region where the segment is connected to the input lead. When hot spots develop, the quality of the image produced is drastically reduced. The use of a more highly conductive substrate overcomes this problem and provides for a more uniform or evenly distributed charge pattern when the electrodes are fired. It should be noted that the more active metal conductors tend to give up material to the receiving surface and if left exposed, will soon be etched away.

A series of electrical terminals 30-30 are contained on the back of the board as shown in FIGS. 4 and 5. Each terminal is attached to an individual electrode segment by a connector 31 (FIG. 5) that passes through the board. The composition block is constructed in the same manner as the digit electrode segments and is connected to a single terminal 32 for firing. Although not shown, the terminals are soldered to individual leads and the leads brought out of the housing by means of a ribbon type harness 33 (FIG. 3).

As shown diagramatically in FIG. 1 and schematically in FIG. 2, the control section 12 of the present invention includes a loader counter unit 40 containing three 4-bit binary decade counters 41 that are arranged in a cascade package. Each counter individually services one of the three digit modules 16-18. A preset count can be set into the counters using thumbwheel switches 35-37 contained in selector unit 38 (FIG. 1). The selector is generally used to begin a counting sequence on any desired count or alternatively to manually set a desired count into the system regardless of the last recorded integer.

The counters are automatically indexed to the next higher number by closing contact 43 of switch SW-1. The switch provides a count-up signal from the logic power supply 45 to each of the counters which is passed through a Schmitts trigger 46 before being applied to the counters. The trigger serves to debounce the count-up signal and thus provides a constant amplitude output signal when a predetermined input value is exceeded. The trigger is enabled by a signal from the digit overflow detection network that functions, as will be explained below, to shut down the count when the capacity of the system is exceeded.

A key switch SW-2 is also provided in the counter circuits which when closed allows the operator to override manually operated switch SW-1 and enables each of the counters so that they can be cleared and a new preset count loaded therein using the thumbwheel switches. Opening the key switch automatically allows the system to pick up on the new preset count that is loaded into the counters. As shown in FIG. 1, a mode selector 47 is operatively connected to the loader counter unit by which the counters can be programmed to either hold the count or to automatically increase or decrease the count as desired. Although a number of different operational modes may be utilized, for purposes of explanation the present invention will be described in further detail with reference to the up count mode only.

The binary (BCD) code generated in the counters is passed on via suitable data lines to driver unit 50 which contains three BCD-to-7 segment drivers that are referenced 51-51. Each driver functions to change the incoming binary coded signal into an output signal suitable for driving one of the 7-segment digit modules. Depending on the count, the electrode segments associated with the modules are fired in a pattern that is indicative of the BCD count loaded into the counters. The output lines from the drivers are connected to a visual display panel 52 containing three 7-segment light-emitting diodes 53-53 for providing a continuous readout of the count stored in the driver unit.

The 7-segment output signal from each driver is applied to a firing control unit 57. The firing control unit contains individual firing circuits for each of the electrode segments contained in the marking head. As noted above, the electrodes are fired in response to the count stored in the driver unit to create an electrical image of the number in the display window. For the purpose of clarity, the firing of the A segment 58 in the unit digit module 18 will herein be explained in further detail. It should be understood, however, that although not all the segment firing control circuits are shown, they all operate in the same manner to regulate the firing of the associated electrode in response to the count programmed into the drivers. When an output signal is placed on the driver output line, a current sensitive relay 60 is energized. The energized relay closes a normally opened contact 61 contained in the segment supply line 62 thereby connecting the segment to the marking head power supply 63 causing the electrode to fire against the surface of the receiving part.

The composing block 15 in the marking head is also fired every time a new count is imaged, that is, every time switch SW-1 is closed to initiate a new count. A current sensitive relay 65 is placed in the logic power supply output line 66 which is energized when the switch is closed. Energizing the relay causes contact 67 to close thus providing a path for current to flow between the marking head power supply 63 and the composing block via line 70. As can be seen, the composing block is fired simultaneously with the digit modules to record the stencil pattern along with the selected count upon the receiving part.

An overflow circuit is also provided in the control section to disable the system when the upper limit of the counter unit is reached. In the event the count goes to 9 in each of the counters, six logic 1 signals are applied to AND gate 72 thereby enabling the gate. This, in turn, sends a signal to pulser 73 turning on alarm 75 which alerts the operator to the overflow count condition. At the same time, the output signal from gate 72 is passed through inverter amplifier 77 to the Schmitts trigger 46 disabling the trigger and preventing further sequencing of the counters. This condition holds until such time as a new preset count is set into the system using the key switch and thumbwheel combination.

With particular reference to FIGS. 3-5, a series of metering ports 80-80 are formed in the front face of the imaging board 14 which serve to bring a supply of electrolyte to the wicking pad 21. The ports are positioned adjacent to the digit modules and the composition block to insure that an adequate supply of the fluid is available to produce clearly discernible marks. As seen in FIG. 5, a short copper tube 81 is passed through the back of the board into each port and is held in place by soldering the tube to a soldering pad 82. A supply hose 83 is attached to the extended end of the tube which is brought out of the housing and attached to a reservoir (not shown) containing electrolyte. In operation, the electrolyte is metered to the wick upon demand via capillary action.

While this invention has been described with reference to the structure disclosed herein, it is not confined to the details set forth and this application is intended to cover any modifications or changes as may come within the scope of the following claims.

We claim:

1. An electrochemical marking system of the type wherein an image is recorded upon a conductive part by firing an electrode against the part in the presence of an electrolyte, said system including
a marking head containing a plurality of electrically isolated electrode segments, said segments including a plurality of seven segment modules for marking selected characters and a composing electrode having a surface area greater than the module segments that is arranged to be fired through a stencil,
switching means for connecting each segment to a power supply for applying a firing potential thereto,
control means for regulating the operation of said switch means to record pre-selected characters upon said part and automatically firing the module segments and the composing module simultaneously.

2. The system of claim 1 wherein each electrode segment is covered with an outer coating of a conductive material that is nonreactive in the presence of said electrolyte to prevent the segments from being etched during the marking process.

3. The system of claim 1 that further includes an indexing means associated with said control means for automatically sequencing the modules to mark numbers in a selected sequence.

4. In an electrochemical marking system for producing a nondestructive permanent mark upon a grounded conductive metal part, apparatus for etching selected characters on the surface of the part that includes
a wetting means for bringing an etch producing electrolyte onto the surface region to be marked,
a marking head arranged to electrically communicate with the wetted surface, said head containing a plurality of electrically isolated electrode segments that are individually connected to a power supply whereby each segment can be fired independently,
each of said electrode segments including a highly conductive body section printed on said head and an outer conductive coating placed over the body section that will not react with the electrolyte to prevent the segment from being etched during the marking process,
switching means for connecting the individual electrode segments to the power supply whereby the segments can be fired in different combinations, and
control means operatively connected to the switching means for firing a selected combination of electrode segments to etch a desired character upon the surface of the part.

5. The system of claim 4 wherein said outer coating includes a binder material having finely divided particles of carbon evenly dispersed therein.

6. The system of claim 4 wherein said segments are arranged in seven bit modules whereby selected numbers can be marked.

7. The system of claim 6 that further includes an indexing means associated with said control means for automatically sequencing the modules to mark numbers in a selected sequence.

* * * * *